Nov. 5, 1940.  E. O. YOUNG  2,220,833

DAMPER CONSTRUCTION AND REMOTE CONTROL THEREFOR

Filed Dec. 3, 1937  2 Sheets-Sheet 1

Inventor
EMIL O. YOUNG.
By Robert Cobb
Attorneys

Nov. 5, 1940.  E. O. YOUNG  2,220,833
DAMPER CONSTRUCTION AND REMOTE CONTROL THEREFOR
Filed Dec. 3, 1937  2 Sheets-Sheet 2
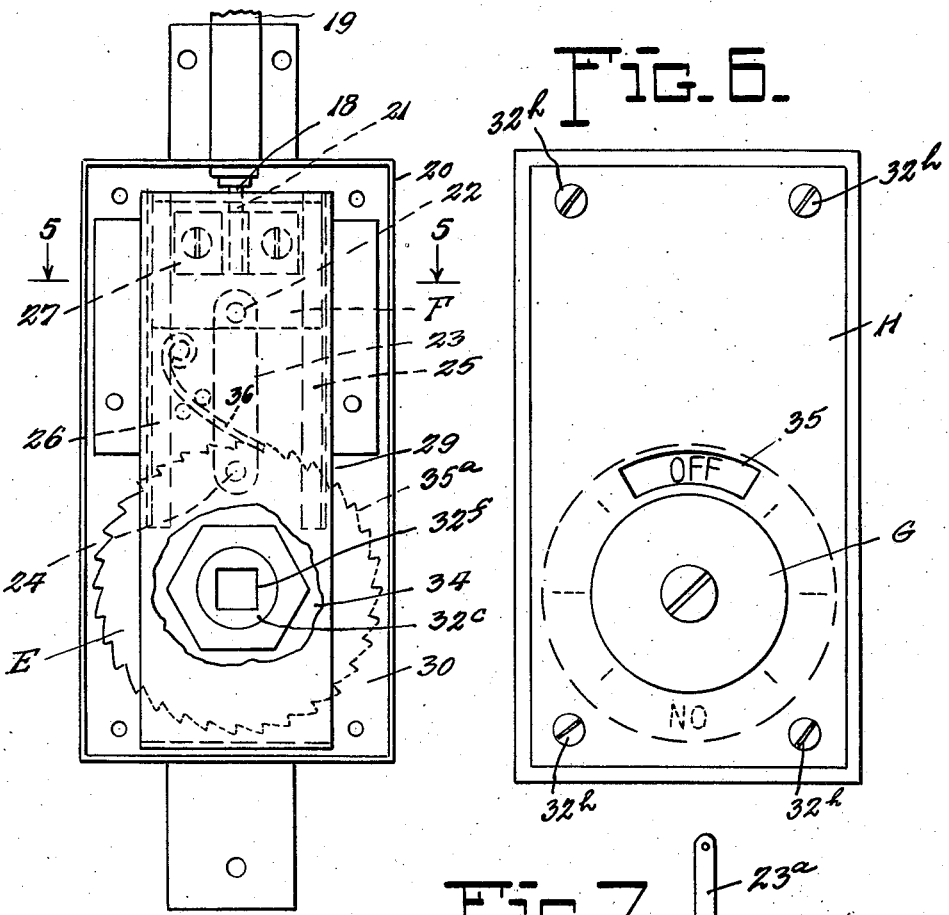
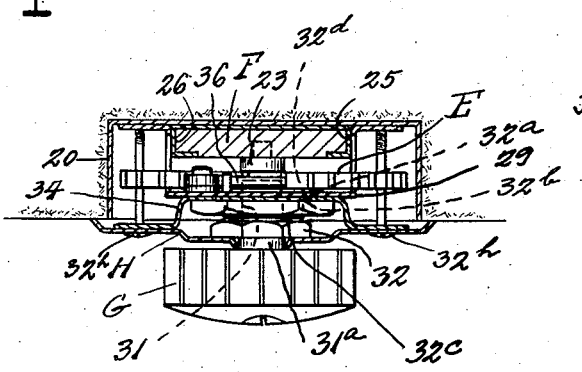
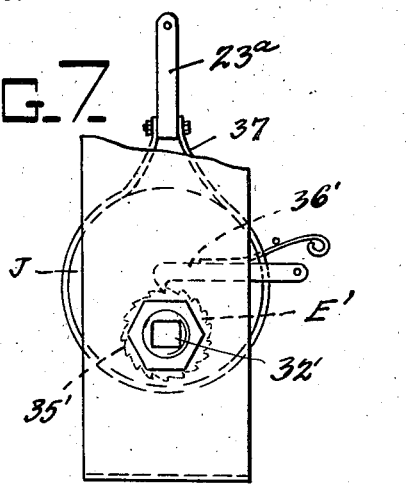
Inventor
EMIL O. YOUNG
By Robb & Robb
ATTORNEYS Patented Nov. 5, 1940

2,220,833

UNITED STATES PATENT OFFICE 2,220,833

DAMPER CONSTRUCTION AND REMOTE CONTROL THEREFOR

Emil O. Young, Cleveland, Ohio

Application December 3, 1937, Serial No. 177,990

5 Claims. (Cl. 98—37)

This invention relates to damper controlling and actuating means for regulating the passage of air through a duct, and more particularly has to do with the means for controlling and regulating dampers or louvers for regulating the passage of air from a duct through openings or registers provided therein.

In the heating installations in large buildings such as schools and other public buildings, the heated air ducts are provided at intervals with outlet openings whereby the heated air passing through the ducts is permitted to pass through such openings into the room or other place desired to be heated. To maintain the proper temperature of such rooms, it is desired to provide convenient operating means for controlling and regulating the passage of heated air through such openings in the ducts of the heating system.

Since the registers of such heating and air conditioning systems are often located at places not readily accessible, a primary object of the invention is to provide a remote control for the operation of dampers in the registers of such systems to enable said dampers to be opened and closed as desired from a station a distance therefrom.

It is an object of the present invention to provide such damper operating and control means for each of the outlet openings of the heating system which shall comprise means for enabling the control instrumentalities to accurately indicate the position of the louvers controlling the passage of air from the ducts through their outlet openings. In accomplishing this object, I have provided resilient means interposed between the sets of louvers to be operated and the actuating means whereby when the control means is operated, there will be no possibility of damaging the louvers in the event that the indicating means of the regulator by some chance should not accurately indicate the position of the louvers.

In carrying out this object, according to the invention, the interposition of the resilient means above mentioned enables the accurate indication by the control or regulator means of the position of the dampers or louvers at all times.

It is the further object of the invention to provide a simple, easily controlled and accurately indicating regulator mechanism, comprising a simple and compact arrangement of the parts thereof, and having other advantages which will appear as the description progresses.

In the accompanying drawings—

Figure 4 is a front view showing the arrangement of parts of the regulator device of the invention.

Figure 5 is a sectional view of the same taken on the lines 5—5 of Figure 4.

Figure 6 is a view of the cover plate of the regulator device showing the indicating instrumentalities thereof.

Figure 7 is a view similar to Figure 4 showing a modified construction of damper regulating instrumentalities.

Figure 1:
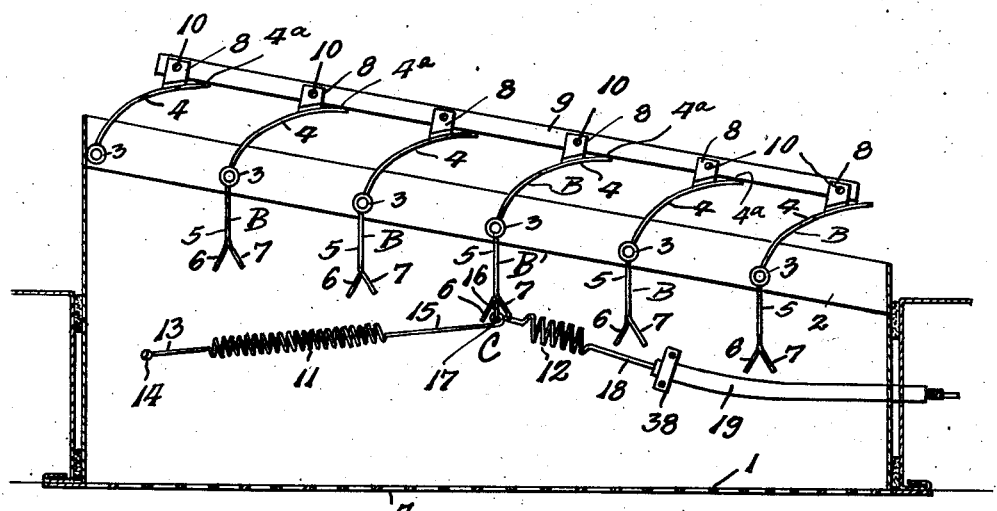
Figure 1 is a horizontal sectional view through a duct, illustrating the arrangement of and the means for actuating the louvers, which are to control the passage of air from the duct through one of its outlet opening, the louvers being of one piece construction pivoted intermediate their ends.

Referring first to Figure 1, A generally indicates the outlet opening of a duct having a grill 1 in the manner of the usual form of registers provided in heating or air conditioning systems of the type to which the invention is applicable. A base 2 positioned on a bias with respect to the longitudinal direction of the duct has pivoted thereto as at 3 louvers B consisting of a rearward portion 4 and a forward portion 5, the portion 5 being provided with vane members 6 and 7 formed by cutting the material of the portion 5 so that alternate vane members 6 and 7 throughout the vertical length of the louvers extend in different directions so as to deflect the currents of air passing from the duct through the outlet opening in different directions.

Figure 3:
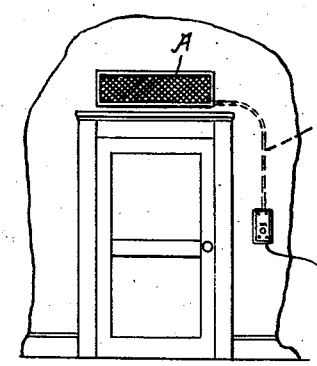
Figure 3 is a plan view of the control and actuating instrumentalities of the invention as when employed for operating and regulating the flow of air through an outlet opening or register positioned above a door of a room.

Links 8 attached to the rearward portion 4 of the louvers B are pivoted to a synchronizing bar 9 as at 10, so that the operation of all louvers B is in unison. Attached to the outer portion 5 of one of the louvers is a spring unit C consisting of two spring members 11 and 12, the spring member 11 being extremely resilient and yieldable while the spring member 12 requires the exertion of considerable pressure to cause it to yield. The end 13 of the spring member 11 is fixed as at 14 to the bottom wall of the duct and the other end 15 is hooked through a hole in the portion 16 of the louver B' at the point 17. One end of spring 12 is connected to the portion 16 in a like manner as the end 15 of spring 11 while the other end 18 of the spring 12 is extended to provide a flexible actuating member 18 which passes through a tube 19 secured to the bottom wall of the duct by plate 38 screwed or otherwise attached to said duct. Said tube 19 passes through the wall to the regulating instrumentalities positioned at a remote location and generally indicated at D in Figure 3.

The purpose of the spring arrangement just described is to provide retracting means for returning the louvers to closed position through operation of the remote control regulating instrumentalities to be described hereinafter, after the louvers have been fully opened thereby. Additionally, said spring arrangement makes provision for the stretching of the actuating member 18 in use and enables the regulating instrumentalities to fully open the louvers without damage thereto.

When moved in a rightward direction, of course, the member 11 actuates the louver B' and through the synchronizing bar 9 the louvers B to open the same to any desired degree to permit the passage of air from the duct through the opening A. Abutment of rear ends 4a with bar 9 limits opening movement of the louvers.

The regulating instrumentalities are now to be described:

Referring to Figures 4 and 5 particularly, it will be seen that the flexible actuating member 18 passes into a wall box 20 containing the regulating instrumentalities, the end portion 21 of the flexible actuating member 18 being attached to a slide member F pivotally connected as at 22 with a link 23. The end portion 21 of the actuator member 18 is attached to the guide member F by means of a clamping plate 27, the middle portion 28 of which is bent outwardly to accommodate the portion 21, the plate 27 being screwed tightly to the slide F so as to tightly connect the portion 21 thereto. The other end of the link 23 is pivoted as at 24 to the ratchet gear E. It will be seen that the slide member F is adapted to slide in guides 25 and 26.

The regulator instrumentalities just described including the slide and guide members are carried by a supporting member 29, which is attached to the rear portion 30 of the box 20 mounted in the wall by any suitable means. A regulating knob G has integrally connected therewith a shaft 31 journaled in an opening in the cover plate H fastened to the wall by any suitable means such as screws 32h and which is positioned directly in front of the regulating instrumentalities of Figure 4.

The plate H has an outwardly pressed portion at the place where the shaft 31 is journaled in it, and on the inner side of the outwardly pressed portion of said plate, a nut 32 is threadingly screwed upon the shaft 31 to hold the shaft and knob G in position upon the plate H and rotatable with respect thereto. The shaft 31 at its inward end is of square configuration to fit into the sleeve member 32f also of square configuration centrally of the ratchet gear E. Shaft 31 is provided with a shoulder 31a so that no clamping action can be exerted upon the front plate H by the nut 32 which would otherwise hinder the free rotation of shaft 31.

The ratchet wheel E is provided with a hub portion 32a having a shoulder 32b and a threaded portion 32c of slightly smaller diameter than main hub portion 32a.

The hub 32a is inserted through a circular opening 32d of the supporting member 29. An indicia disc or dial plate 34 having a central circular opening is carried upon the threaded portion 32c and caused to be maintained tightly against the shoulder 32b by means of a nut screwed upon the threaded portion 32c against said dial plate 34. The dial plate is thereby fixed to the ratchet wheel E to rotate therewith and said ratchet is maintained rotatably secured to the supporting member 29 by said dial plate 34.

The hub portion 32c of the ratchet wheel E is further provided with a square opening 32f for reception of the square end of shaft 31 so that when said end is inserted in the square opening 32f rotation of knob G and shaft 31 will be transferred to the ratchet wheel E to cause corresponding rotation thereof.

Upon the dial plate 34 appear indicia such as indicated in Figure 6 as "Off" and "On," the indicia "Off" appearing through the sight opening 35 of the plate H when the eccentric pivot 24 is in the position shown in Figure 4.

While I prefer to mount the dial plate 34 on the hub 32a of the ratchet wheel E, as above described, said plate may, within the purview of the invention, be mounted upon the shaft 31 and fixed to rotate therewith.

When the knob G is turned to the right, it will actuate the ratchet gear E through the medium of the shaft 31 and sleeve 32c to rotate said ratchet gear E in a clockwise direction. Said ratchet gear E is prevented from being rotated in a counterclockwise direction by the arrangement of the teeth 35a and the ratchet finger or spring 36 engaging therewith.

Rotation of the ratchet gear E, in a clockwise direction, as above described, will, when the regulating instrumentalities are in the positions shown in Figure 4, actuate the link 23 through the pivot 24 to pull the slide member F downwardly thus causing the actuating member 18 through its end portion 21 connected with the slide member to pull upon the louvers B to open the same and when the eccentric pivot 24 is at its downwardmost position of movement, the disc 34 rigidly fastened to the hub 32a will have been likewise caused to rotate so that the indicia On will appear at the sight opening 35 indicating that the louvers B and B' are open.

Should it occur in the operation of the regulator and actuating instrumentalities herein described that for some reason or other the indicating disc 34 with its Off and On indicia should not be correlated with the actual positions of the louvers such that the latter might actually be entirely open although the indicia On did not appear at the sight opening, further turning of the knob G will not cause damage to the louvers through pull of the member 18 because at this point the spring 12 will yield and save the louvers from damage which might otherwise be caused.

In practise, the actuating member 18 is of such length that the spring 12 will be placed under tension shortly before the slide F reaches its lowermost position.

The louvers, therefore, will be fully open with their rear ends 4a abutting bar 9 before the eccentric pivot 24 reaches its lowermost position in the revolution of ratchet wheel E. Further rotation of said wheel to carry pivot 24 beyond the point at which the louvers will be fully open will cause stretching of spring 12 until the pivot reaches its lowest position, at which time the indicia "On" of the dial plate 34 will appear at the sight opening 35.

Figure 7 illustrates a modification of the ratchet gear and actuating mechanism which is described as follows:—A link 23a has attached thereto a metal band 37 surrounding an eccentric member J which has attached thereto a ratchet gear E', the teeth 35' of which are engaged by a ratchet member 36'. The ratchet gear E' has a central sleeve portion 32' with an opening of square configuration into which is adapted to fit the shaft 31 as previously described.

Actuation of the ratchet gear E' by the knob G in a clockwise direction will rotate the eccentric J when in the position of Figure 7 to pull down upon the link 23a, until said link is in its lowermost position after which further actuation of the ratchet gear E in a clockwise direction will cause the link 23 to move upwardly permitting the louvers to be closed with the aid of the pull of the spring 11.

Figure 2:
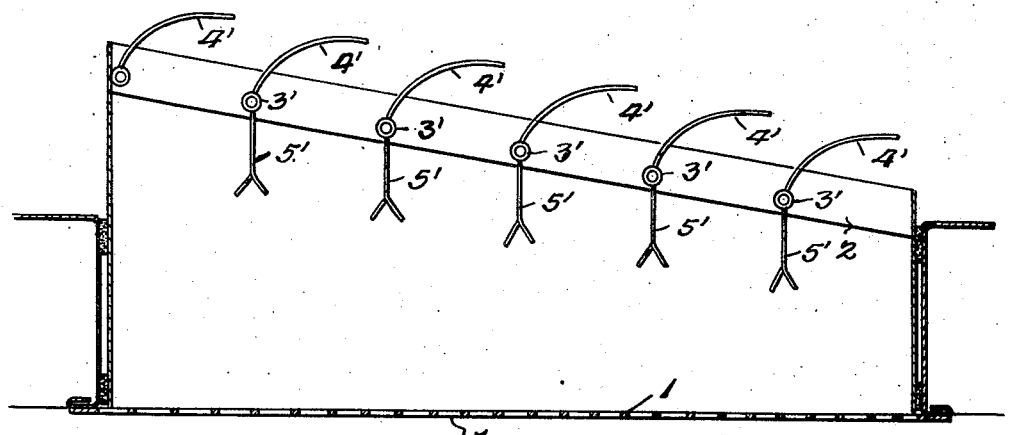
Figure 2 is a horizontal sectional view through a duct showing the arrangement of the louvers in a modified construction, each of which consists of two separately pivoted members.

Figure 2 illustrates the use of louvers which may be operated by hand without the interposition of the actuating instrumentalities herein described. As shown in this latter mentioned figure the louvers are pivotally mounted upon a base member 2 and comprise rear portions 4' and forward portions 5' each of which is separately pivoted at 3' to the base member 2. In this construction, the louvers may be set individually in their desired positions by hand by simply removing the grill 1 positioned in the opening A and moving the portions 4' and 5' by hand to their desired positions of adjustment.

In the system shown in Figure 1, utilizing the regulator mechanisms of either Figure 4 or Figure 7, it will be understood that actuation of the ratchet gears E or E' in a clockwise direction will serve, when links 23 or 23a are in their uppermost positions as shown in Figures 4 and 7, to exert a pull upon the actuator 18 and spring 12 serving through these instrumentalities to move the louvers toward their fullest open positions against the comparatively light resistance of spring 11. The spring 12 being of much stiffer construction than the spring 11 and comparatively unyieldable, therefore, will not be stretched under normal conditions of actuation by the operation of ratchet gears E and E' and their associated instrumentalities, until the louvers are fully open.

The actuation of actuating member 18 and spring 12 in a rightward direction being at all times against the resistance of spring 11, any release of the pressure exerted upon said actuating member 19 and spring 12 will cause retraction of these instrumentalities, as when pivot 24 passes its lowest position and starts upwardly.

In the rotation of the ratchet gears E or E' the greatest pull on the actuator 18 will come when the slide F is in its lowermost position as when the dampers are in fully open position and the indicia On of the disc 34 appears at the sight opening 35. Further rotation of the gears E or E' will, of course, cause the slide F to move upwardly releasing pull on the actuator 18 and permitting retraction thereof by the spring 11.

It will be noted, upon reference to Figures 1 and 2, that means have been provided for obtaining equal distribution or diffusion of the air currents at all points of the outlet opening or register. It is a common failing of devices of this type that the air currents are concentrated in certain areas of the outlet opening and that other areas constitute what might be termed as "dead" areas. To overcome this difficulty, I position the louvers on a bias with respect to the duct, as before mentioned, and provide each of the dampers with several of the alternate vane members 6 and 7 to deflect the air currents over the entire area of the outlet opening or register.

The construction of Figure 2 is designed to enable each of the dampers and each of the portions 4' and 5' thereof to be manually preset individually prior to emplacing the grill A, and the setting will be such as to insure diffusion of the air currents over the entire area of the register, thereby eliminating so-called "dead" areas.

The purpose of diffusion of the air currents in the manner herein described, of course, is to eliminate the possibility of drafts and hot or cold spots.

It will be understood to be contemplated within the purview of the invention, that the portion 21 of the actuator wire or cable 18 may be directly connected eccentrically to the ratchet wheel in any suitable way, should this be found desirable.

Having thus described my invention, what I claim as new and desire to secure by Letters Patent of the United States is:

1. A control unit, for dampers, comprising, in combination, rotatable control means, damper actuating means eccentrically connected to said control means for operation thereby, an indicating disc cooperative with said rotatable control means and adapted to rotate in correspondence with the rotation of said control means, said indicating disc carrying indicia for indicating the position of the damper in accordance with the rotation of said control means, and a cover plate for said unit having a sight opening adapted to reveal the indicia upon said disc corresponding to the position of the damper.

2. In a device of the class described, in combination, a duct through which air currents are adapted to pass and having an outlet opening therein, a base member positioned on a bias with respect to said duct, a plurality of dampers pivoted to said base, each damper including a plurality of vane members, alternate ones of which extend in different directions, said vane members adapted to deflect the air currents passing through said outlet opening in different directions so as to effect diffusion of said air currents, and means interconnected with said dampers whereby they may be caused to move in unison.

3. In a device of the class described, in combination, a duct through which air currents are adapted to pass and having an outlet opening therein, a base member positioned on a bias with respect to said duct, a plurality of dampers each comprising a forward and rearward portion, each of said portions being pivoted to said base, one of said portions including a plurality of vane members alternate ones of which extend in different directions, said vane members being adapted to deflect the air currents in different directions, and each of the forward and rearward portions of each damper being adapted to manual presetting whereby to effect diffusion of the air currents over the entire area of the outlet opening.

4. In a device of the character described, a damper, spring means biasing the damper to closed position, cable actuating means connected to said damper and adapted to be actuated from a remote control station, control means for said actuating means comprising a rotatable member, detent mechanism permitting movement of said rotatable member in a single direction, and means eccentrically connecting said actuating means to said rotatable member whereby said damper will be alternately moved between open and closed position upon movement of said rotatable member in a single direction.

5. In combination with a device as claimed in claim 4, indicating means comprising an indicating member and an indicia carrying device movable relatively to said indicating member to various indicating positions, said rotatable member being connected to said indicating means for causing relative movement of said indicia carrying device with respect to said indicating member in accordance with the movement of said rotatable member to cause said indicating means to indicate the relative position of said damper.

EMIL O. YOUNG.